2,916,428
CHLORINATION PROCESS

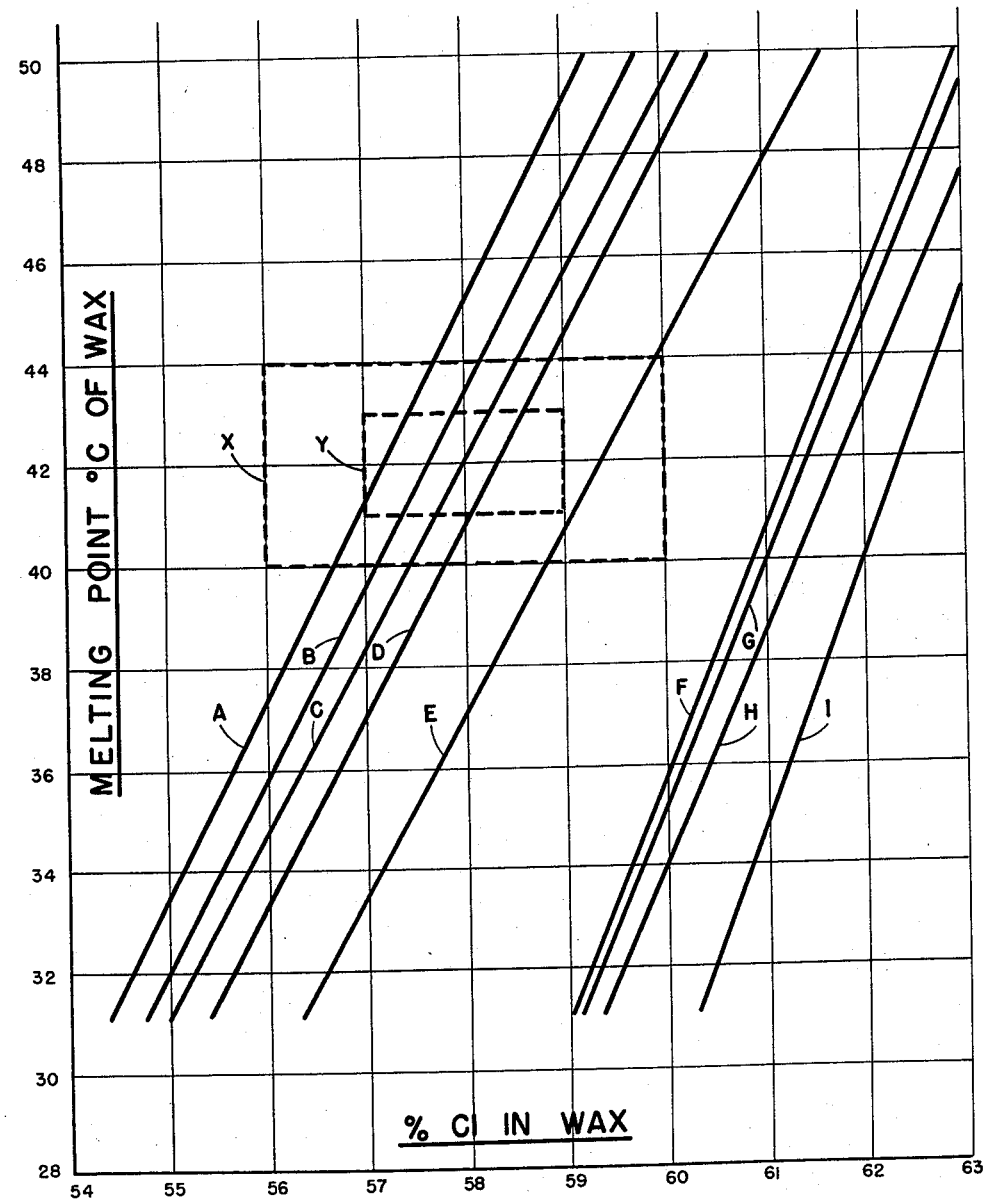

Thomas E. Stretton, Levittown, N.Y., and Franklyn D. Miller, Cincinnati, Ohio, assignors to National Distillers and Chemical Corporation, New York, N.Y., a corporation of Virginia Application November 13, 1956, Serial No. 621,847

9 Claims. (Cl. 204—163)

This invention relates to a process of chlorinating waxes and the chlorinated products derived therefrom. More particularly, the invention pertains to a chlorination process wherein mixtures of soft wax and oil are highly chlorinated to obtain stable compositions having high melting points.

A large number of processes for the chlorination of paraffin waxes have been disclosed in the art. When producing a high melting point product, these processes have generally comprised chlorinating a refined paraffin wax with gaseous chlorine in the presence of a volatile solvent under well established temperature and pressure conditions. Actinic light and various chemical catalysts have often been employed to promote the chlorination reaction. The conventional chlorination methods, however, have not been able to effectively utilize a soft wax to produce a highly chlorinated product having a high melting point, stability and a white or substantially colorless appearance. It has been found, for example, that when high molecular weight hydrocarbons such as waxes are chlorinated severe stability problems and undesirable colors are encountered at elevated temperatures. One object of the invention is the preparation of chlorinated wax compositions having the properties outlined above. Another object of this invention is to prepare such chlorinated wax compositions in the absence of solvents which have to be subsequently separated from the reaction products. Other objects of the invention will become apparent from the following description.

In accordance with the present invention, it has now been found that a chlorinated wax product having a high chlorine content as well as the desired melting point, stability, and color properties may be prepared by chlorinating a wax-oil feed mixture comprising a major proportion of a soft paraffin wax and a minor proportion of a hydrocarbon oil. The chlorinated waxes prepared by the process of the invention may be employed in many of the conventional chlorinated wax applications. These chlorinated waxes may, for example, be used for imparting water and fire resistance to various materials. A particularly outstanding use of the chlorinated waxes of the invention is in the preparation of mastic tiles, having excellent oil resistance, grease resistance and hardness characteristics. More specifically, it has been found that a chlorinated wax prepared according to the process of this invention and having a chlorine content within the range of about 56 to 60%, preferably about 57 to 59%, and a melting point of about 40° to 44° C., preferably about 41° to 43° C., is especially useful in the preparation of mastic floor and wall tiles.

In general, the wax feed mixtures useful for the purposes of the invention comprise about 55 to 80%, preferably about 60 to 75 wt. percent of a soft paraffin wax and about 20 to 45%, preferably about 25 to 40 wt. percent of a normally liquid paraffinic hydrocarbon oil. The paraffin wax is preferably a soft or slop wax having an ASTM melting point of about 37° to 47° C., an API gravity of about 42 to 46, an ASTM penetration of at least 317 and a molecular weight of about 280 to 400. The hydrocarbon oil may comprise straight or branched chain aliphatic hydrocarbons or mixtures thereof having a molecular weight within the range of about 280 to 400, a viscosity index of about 95 to 105, a viscosity of about 105 SSU at 100° F., and 40 SSU at 210° F., and an API gravity of about 30 to 34. Preferably, the hydrocarbon oil employed will have an average molecular weight at least equal to the molecular weight of the wax. Both the wax and hydrocarbon oil may be derived from various paraffinic or mixed base petroleum crudes by conventional refining methods used in the production of refined waxes and lubricating oil base stocks.

In accordance with another aspect of the invention, it has been found that a minor proportion of a solvent may be advantageously employed in conjunction with the foregoing wax and hydrocarbon oil materials to make up the wax feed mixture. Though the theory is not entirely understood, the use of the solvent appears to minimize the foaming difficulties which are sometimes encountered in the chlorination of paraffin waxes. The solvent employed must be of such a nature that its separation from the other chlorination products is not necessary. The solvent will generally comprise a mixture of highly branched chain saturated hydrocarbons having eleven or more carbon atoms, preferably about $C_{11}$ to $C_{14}$, with a boiling point within the range of about 176° to 260° C., and an average molecular weight of about 160 to 190. A particularly effective solvent is the heavy ends obtained from the reaction of butylene with isobutane as is done in the preparation of alkylate to be used for gasoline blending. This solvent has the following specification:

Boiling point _____ 190°–240° C., 50% 204° C.
Aniline point _____ 84–92.
Flash point _____ 140° F.
Specific gravity _____ 0.7682.
Average molecular wt. ____ 180.
Constituents—
    Olefins _____ 5.7%.
    Saturates _____ 83.0%.
    Naphthenes _____ 11.3%.

When the solvent is employed the feed mixture will comprise about 50 to 75%, preferably about 57 to 65%, by weight of the soft wax; about 20 to 35%, preferably about 28 to 31%, by weight of the hydrocarbon oil; and about 2 to 25%, preferably about 5 to 15%, by weight of the solvent.

The soft wax-oil feed mixture of the invention with or without the use of the aforesaid solvent may be chlorinated by conventional means. It is preferred, however, that the chlorination be carried out by passing gaseous chlorine through the wax mixture at a reaction temperature of about 212° to 230° F. and under superatmospheric pressure, e.g. about 10 to 100 p.s.i.g., in the presence or absence of actinic light or chemical catalysts. Chlorination may be continued until the desired chlorine content has been achieved. Time periods within the range of about 10 to 40 hours are usually sufficient for the purposes of the present invention. Either batch or continuous operations may be employed. It is, for example, within the scope of this invention to utilize a series of two to four or more chlorination reactors with a continuous countercurrent flow of the gaseous chlorine and wax feed mixture. The series of chlorination reactors may also be operated batch-wise with the fresh chlorine gas being first passed into the end reactor and then to each of the preceding reactors.

Usually, the chlorinated wax prepared in accordance with this invention will be blown with air or nitrogen to remove free chlorine and hydrogen chloride. It will be understood that minor amounts of conventional stabilizers may be incorporated in the finished chlorinated wax composition. Such stabilizers may, for example, include various inorganic and organic compounds known to the art. Illustrative stabilizers include: glycols such as ethylene glycol and propylene glycol, polymers of epoxyalkyl alkenyl ethers, tin hydrocarbons such as tetrabutyl tin, iron salts such as iron chloride and iron sulfate, etc.

If actinic light is employed for promoting the chlorination reaction any of the well known commercial light sources, which will induce or speed the chlorination of waxes, may be used such as tungsten filament lamps, ultraviolet lamps, mercury vapor arc lamps, fluorescent lamps, ordinary light bulbs, and the like.

The invention will be further understood by reference to the following example:

EXAMPLE

A number of wax feed mixtures, as listed below in the table, were chlorinated as follows:

The wax feed mixture was subjected to chlorination in a four step batch operation. The fresh feed wax mixture was fed to the first chlorination reactor, and then successively to each of the three remaining chlorination reactors. Fresh gaseous chlorine was fed directly to the fourth reactor in the series and then successively to each of the preceding reactors. Consequently, the fresh feed wax was contacted with a gaseous mixture comprising chlorine and hydrogen chloride. The degree of chlorination was increased as the wax feed mixture was passed from the first through the fourth chlorinaton reactor. A temperature of about 105° C. and a pressure not exceeding 50 p.s.i.g. was maintained in each of the chlorination reactors. The time period required to chlorinate the feed material varied from about 10 to 15 hours. The chlorinated wax recovered from the fourth chlorination vessel was air blown at a temperature of about 105° C. to remove residual chlorine and hydrogen chloride.

The composition of the wax feed mixtures and the characteristics of the finished chlorinated wax products is tabulated below:

Table

| Run | Wax Feed Mixture | | Wt. percent Solvent [3] | Chlorinated Wax | |
|---|---|---|---|---|---|
| | Wt. Percent Wax [1] | Wt. Percent Oil [2] | | Percent Cl | M.P., °C. |
| 1 | 60.0 | 40.0 | | 59 | 49 |
| 2 | 60.0 | 40.0 | | 58 | 45 |
| 3 | 60.0 | 40.0 | | 57 | 41 |
| 4 | 60.0 | 40.0 | | 56.5 | 39 |
| 5 | 60.0 | 40.0 | | 56 | 37 |
| 6 | 65.0 | 35.0 | | 59 | 47 |
| 7 | 65.0 | 35.0 | | 58 | 43.3 |
| 8 | 65.0 | 35.0 | | 57 | 39.5 |
| 9 | 65.0 | 35.0 | | 56 | 35.8 |
| 10 | 63.7 | 31.3 | 5.0 | 60 | 49.3 |
| 11 | 63.7 | 31.3 | 5.0 | 59 | 45.5 |
| 12 | 63.7 | 31.3 | 5.0 | 58 | 42 |
| 13 | 63.7 | 31.3 | 5.0 | 57.5 | 40 |
| 14 | 63.7 | 31.3 | 5.0 | 57 | 38.3 |
| 15 | 72.3 | 27.7 | | 59 | 44.4 |
| 16 | 72.3 | 27.7 | | 58.5 | 42.5 |
| 17 | 72.3 | 27.7 | | 58 | 41.2 |
| 18 | 72.3 | 27.7 | | 57.5 | 38.8 |
| 19 | 72.3 | 27.7 | | 57 | 37 |
| 20 | 57.0 | 28.0 | 15.0 | 60 | 44.2 |
| 21 | 57.0 | 28.0 | 15.0 | 59.5 | 42.5 |
| 22 | 57.0 | 28.0 | 15.0 | 59 | 40.7 |
| 23 | 57.0 | 28.0 | 15.0 | 58.5 | 38.9 |
| 24 | 57.0 | 28.0 | 15.0 | 57 | 33.5 |
| 25 | 87.0 | 13.0 | | 62 | 47.8 |
| 26 | 87.0 | 13.0 | | 61 | 40.5 |
| 27 | 87.0 | 13.0 | | 60.5 | 38.1 |
| 28 | 87.0 | 13.0 | | 60 | 35.7 |
| 29 | 82.6 | 12.4 | 5.0 | 62 | 49.7 |
| 30 | 82.6 | 12.4 | 5.0 | 61 | 40 |
| 31 | 82.6 | 12.4 | 5.0 | 60.5 | 36.3 |
| 32 | 82.6 | 12.4 | 5.0 | 60 | 35.2 |
| 33 | 74.0 | 11.0 | 15.0 | 62 | 43.1 |
| 34 | 74.0 | 11.0 | 15.0 | 61 | 38.5 |
| 35 | 74.0 | 11.0 | 15.0 | 60.5 | 36.3 |
| 36 | 74.0 | 11.0 | 15.0 | 62 | 34 |
| 37 | 65.2 | 9.8 | 25.0 | 61 | 40 |
| 38 | 65.2 | 9.8 | 25.0 | 60.5 | 34.9 |
| 39 | 65.2 | 9.8 | 25.0 | 60.5 | 32 |

[1] In runs 1 to 24 the wax has the following specification: A melting point of 104.0° F. and an API gravity of 44.1. In runs 25 to 39 the wax has the following specification: A melting point of 116.6° F. and an API gravity of 41.1.
[2] The hydrocarbon oil employed had the following specification: A flash point of 380° F., 95 V.I., and a viscosity of 65 SUS 130° F.
[3] The solvent is one described in column 2 of the specification.

In the accompanying graph, percentage chlorine is plotted against melting point data obtained from the chlorinated wax properties tabulated above. The relationship between the plotted curves and the runs is as follows:

| Curve | Runs |
|---|---|
| A | 1 to 5 |
| B | 6 to 9 |
| C | 10 to 14 |
| D | 15 to 19 |
| E | 20 to 24 |
| F | 25 to 28 |
| G | 29 to 32 |
| H | 33 to 36 |
| I | 37 to 39 |

The rectangular area defined by dotted line X sets the bounds within which the properties of the desired chlorinated wax composition fall, i.e. a melting point of about 40° to 44° C. and a chlorine content of about 56 to 60%. Dotted line Y, on the other hand, sets the bounds of the preferred properties, i.e. a melting point of about 41° to 43° C., and a chlorine content of about 57 to 59%. The above data, as graphically illustrated, show that a wax feed mixture comprising about 55 to 80%, preferably about 60 to 75%, soft wax and about 20 to 45%, preferably about 25 to 40%, hydrocarbon oil must be employed in order to obtain the desired melting point and chlorine content. The above data also shows that a hydrocarbon solvent may also be successfully employed in conjunction with the wax and the hydrocarbon oil provided that the amount of hydrocarbon oil employed does not constitute less than about 20% by weight of the wax feed mixture. The desired chlorinated wax compositions prepared by the method outlined above have a density ranging from about 1.290 to 1.350.

It will be understood that the invention is not necessarily limited by the reactants and the operating conditions employed in the foregoing example. The reactants and operating conditions may be varied within the limits indicated in the general portions of the specification.

What is claimed is:

1. A process for the preparation of a chlorinated wax composition having a melting point of about 40° to 44° C. and a chlorine content of about 56 to 60 wt. %, which comprises chlorinating a mixture comprising about 55 to 80 wt. % of a soft paraffin wax having a molecular weight of about 280 to 400 and about 20 to 45 wt. % of a paraffinic hydrocarbon oil having a molecular weight of about 280 to 400 with chlorine.

2. The process of claim 1 wherein said mixture also contains about 5 to 25 wt. % of a hydrocarbon solvent comprising branched chain, saturated hydrocarbons having at least 11 carbon atoms per molecule.

3. The process of claim 2 wherein said hydrocarbon solvent has an average molecular weight of about 180 and a boiling point of about 190° to 240° C.

4. The process of claim 1 wherein said paraffin wax has a melting point of about 37° to 47° C.

5. The process of claim 1 wherein said hydrocarbon oil has a molecular weight at least equal to the molecular weight of said soft paraffin wax.

6. A process for the preparation of a chlorinated wax composition having a melting point of about 41° to 43° C. and a chlorine content of about 57 to 59%, which comprises reacting a mixture of about 60 to 75 wt. % of a soft paraffin wax having a melting point of about 37° to 47° C. and about 25 to 40% of a paraffinic hydrocarbon oil having a molecular weight of about 280 to 400 with gaseous chlorine at a temperature of about 100° to 110° C. and a pressure of about 10 to 50 p.s.i.g., and recovering said chlorinated wax composition.

7. The process of claim 6 wherein said mixture contains about 5 to 25 wt. % of a hydrocarbon solvent comprising branched chain, saturated hydrocarbons having at least 11 carbon atoms per molecule and having a molecular weight of about 160 to 190.

8. The process of claim 6 wherein said mixture is chlorinated with gaseous chlorine in the presence of actinic light.

9. A light colored, stable chlorinated wax composition having a melting point of about 40 to 44° C. and a chlorine content of about 56 to 60% prepared in accordance with the process of claim 1.

References Cited in the file of this patent

UNITED STATES PATENTS

| | | |
|---|---|---|
| 1,129,165 | Buchner | Feb. 23, 1915 |
| 1,836,267 | McDill | Dec. 15, 1931 |
| 2,214,877 | Clark | Sept. 17, 1940 |
| 2,350,984 | Britton et al. | June 13, 1944 |
| 2,369,117 | Carter | Feb. 13, 1945 |
| 2,403,179 | Hull et al. | July 2, 1946 |
| 2,433,419 | Bosko | Dec. 30, 1947 |
| 2,492,417 | Frilette | Dec. 27, 1949 |
| 2,530,699 | Humphrey et al. | Nov. 21, 1950 |